United States Patent
Bullister

[19]

[11] Patent Number: 5,854,623

[45] Date of Patent: Dec. 29, 1998

[54] TWO- AND THREE-DIMENSIONAL TRACKBALL WITH ENHANCED MEASUREMENT OPTICS

[76] Inventor: Edward T. Bullister, 86 Concord St., Newton, Mass. 02139

[21] Appl. No.: 558,710

[22] Filed: Nov. 16, 1995

Related U.S. Application Data

[63] Continuation-in-part of Ser. No. 337,979, Nov. 14, 1994, Pat. No. 5,854,623.

[51] Int. Cl.[6] .................................................. G09G 5/08
[52] U.S. Cl. .......................................... 345/167; 345/163
[58] Field of Search .................................... 345/156–168

[56] References Cited

U.S. PATENT DOCUMENTS

| | | | |
|---|---|---|---|
| 3,625,083 | 12/1971 | Bose .................................. | 74/471 XY |
| 3,643,148 | 2/1972 | Brown ................................. | 318/628 |
| 4,404,865 | 9/1983 | Kim .................................. | 74/471 XY |
| 4,562,347 | 12/1985 | Hovey et al. ........................... | 250/221 |
| 4,811,608 | 3/1989 | Hilton ................................. | 73/862.04 |
| 4,933,670 | 6/1990 | Wisloc ................................. | 340/709 |
| 4,952,919 | 8/1990 | Nippoldt ............................... | 340/710 |
| 4,961,138 | 10/1990 | Gorniak ................................ | 364/200 |
| 5,008,528 | 4/1991 | Duchon ................................ | 345/167 |
| 5,019,809 | 5/1991 | Chen .................................. | 345/167 |
| 5,122,654 | 6/1992 | Koh et al. ............................. | 345/163 |
| 5,132,672 | 7/1992 | Clark .................................. | 340/710 |
| 5,171,978 | 12/1992 | Minlitch et al. ........................ | 345/167 |
| 5,181,181 | 1/1993 | Glynn ................................. | 364/566 |
| 5,223,709 | 6/1993 | Pettypiece, Jr. ........................ | 345/161 |
| 5,237,311 | 8/1993 | Malley ................................ | 340/710 |
| 5,248,961 | 9/1993 | Fujii .................................. | 345/167 |
| 5,252,970 | 10/1993 | Baronowsky ........................... | 345/161 |
| 5,288,993 | 2/1994 | Bidiville et al. ........................ | 345/163 |
| 5,296,871 | 3/1994 | Paley ................................. | 345/163 |
| 5,298,919 | 3/1994 | Chang ................................ | 345/163 |
| 5,473,344 | 12/1995 | Bacon et al. .......................... | 345/163 |
| 5,562,552 | 10/1996 | Thurman .............................. | 473/379 |
| 5,635,956 | 6/1997 | Tak .................................... | 345/163 |

*Primary Examiner*—Jeffery Brier
*Assistant Examiner*—David L. Lewis

[57] ABSTRACT

A cursor control device for computers includes a ball whose surface is marked with a regular pattern based on the Platonic solids. The ball surface is illuminated and the rotations are measured precisely from the observed motions of the Platonic solids. The precision of measurement enables the rotation to be measured about other axes and transformed to the desired coordinates without undue deterioration of accuracy.

In one embodiment, a nonplanar retainer exposes adjacent faces of a trackball for three components of rotation. In another embodiment, the ball rotation is measured inside a mouse, and the high accuracy of detection of rotation enables collection of transformed rotations from a sensor mounted to the side for a more compact design.

17 Claims, 8 Drawing Sheets

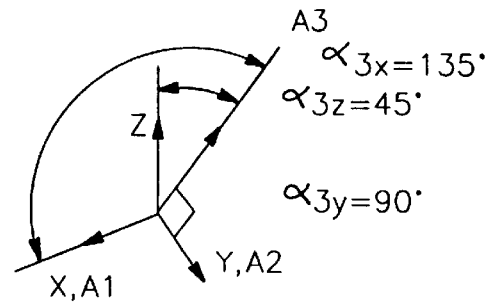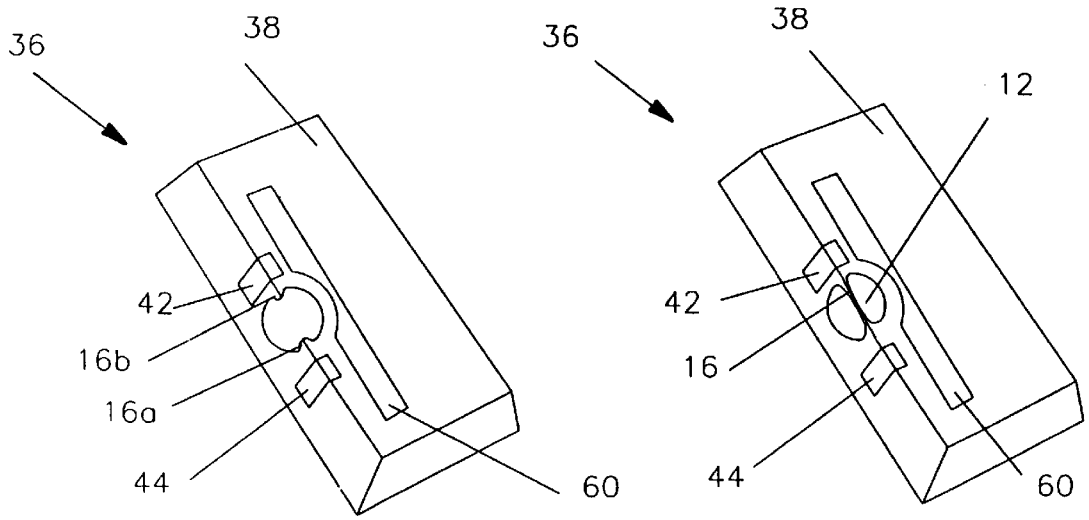
*FIG. 3A*  *FIG. 3B*
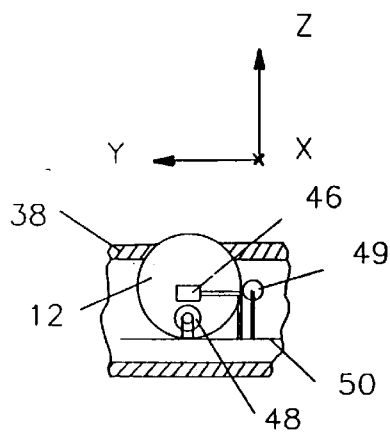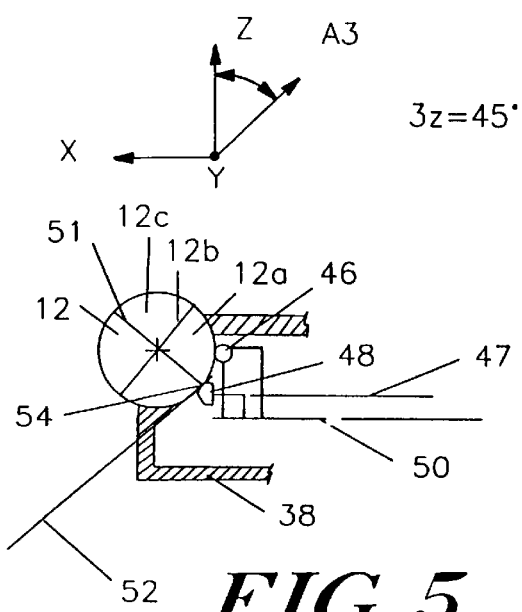
*FIG. 4*  *FIG. 5*

TWO- AND THREE-DIMENSIONAL TRACKBALL WITH ENHANCED MEASUREMENT OPTICS

This is a continuation-in-part of Ser. No. 08/337,979, Filed Nov. 14, 1994, now U.S. Pat. No. 5,854,623.

BACKGROUND—FIELD OF INVENTION

This invention relates to a pointing device providing an interface between a user and a computer for the input of two- and three-dimensional spatial coordinates, and to a method of measuring rotations from the sensing ball and transforming them into rotations about standard Cartesian coordinates.

BACKGROUND OF THE INVENTION

Tracking devices such as trackballs and mice are used in modern computer systems for a variety of purposes. A user can use them to tell a computer to move a cursor on a computer display. The ability to control a cursor is an integral part of the graphical user interfaces (GUIs) common in modern window-based computing systems.

Trackballs are also used to input spatial translational and rotational coordinates into computer systems. This is commonly done in drafting and computer-aided-design packages. In these applications packages, the motion of the pointing device is used to define corresponding locations in a coordinate system in the applications package.

The physical design of a typical trackball is described in U.S. Pat. No. 5,122,654 to Kanas Koh and Josef Bismanovsky, issued on Jun. 16, 1992. In the description of a trackballs provided below, all rotations and orientations are with respect to a sphere coextensive with the surface of a ball and fixed with respect to a trackball housing.

A ball is enclosed within a housing. A portion of one hemisphere of the ball is exposed to be rolled by a user's hand or finger(s). Two sensors mounted on a horizontal circuit board sense the ball rotation and generate signals that correspond to the rotation and communicate them to a computer. Each sensor contains a cylindrical roller which contacts the ball in a small area about a nominal, centralized contact point. The rollers' axes are mutually orthogonal and parallel to the circuit board. The rollers contact the sphere in the bottom hemisphere (below the equator), and roll along great circles of the sphere orthogonal to the equator (meridians). These typical circuit board mounted sensors measure ball rotations about axes parallel to the circuit board but do not measure rotation about the axis perpendicular to the circuit board.

Some cursor control devices have optically tracked the translation with regular, uniform patterns based on Cartesian (x-y) coordinates on flat mouse pads. However, Cartesian or spherical coordinates do not provide a regular, uniform pattern on a sphere. As a result, optical measurements on the spherical trackballs resort to tracking of random patterns on the ball surface. There is a need for a regular, well-defined pattern on a spherical to enable accurate, repeatable measurement of ball rotations in cursor control devices such as mice and trackballs.

It is usually desirable in a mouse or trackball to have as large a ball as possible. A larger ball in a mouse can smoothly roll over dirt or surface irregularities which may cause a smaller ball to become stuck. A larger ball in a trackball gives more control to the user. However, the location of the optical pick-up element can restrict the size of the ball. There is therefore a need for a method to maximize the diameter of the ball with respect to the space available for the mouse or trackball.

Trackballs are preferred over mice in portable computers because they can be built into the portable computer and need not translate relative to any fixed surface. Trackballs do not require the open flat surface over which a mouse must move.

Often, an undesirably bulky and protruding trackball mount is the best that manufacturers can achieve and illustrates the difficulties that have been encountered in locating the trackball in portable computers. In other designs the trackball must be detached or retracted within the computer for transport. In typical transportable trackballs, a retainer ring (which must be removable for cleaning the ball) leaves less than one half (one hemisphere) of the ball surface exposed. Furthermore, size constraints imposed in compact portable computer designs limit the size of the ball itself. The limited exposed area of these small balls limits accuracy and results in poor ergonomics.

In the current art, the specification of three-dimensional (3-D) coordinates, and, in particular, the specification of 3-D rotational coordinates, can be extremely difficult. Several approaches have been developed, each of which has inherent problems.

In a first approach, a three-axis trackball is described in the article "Tablet-based Valuators that Provide One, Two, or Three Degrees of Freedom", by K. B. Evans, et. al. in Computer Graphics, V 15, No. 3 (Aug. 01, 1981) at p. 95. This 3-D trackball has three sensors which convert ball rotations about three axes into electrical signals corresponding to three independent coordinates, in contrast to a 2-D trackball, which has two sensors which convert ball rotations about two axes into electrical signals corresponding to two independent coordinates. This 3-D trackball is simply a 2-D trackball to which a third sensor has been added. The authors remark that the device is awkward to use because rotation about the z-axis requires one to grip the ball with several fingers in order twist it.

In the second approach, a sequence of signals from a 2-D input device are used to simulate a signal from a virtual 3-D trackball. An example of such a method is described in U.S. Pat. No. 5,019,809 to Michael Chen (May 28, 1991). Using this technique, the user must imagine a spherical surface on a circle appearing on the screen and manipulate this virtual trackball with a physical trackball or mouse. The additional layer of abstraction separates the user from the sense of directly manipulating the object and compromises accuracy. The patent remarks that this is necessitated by the fact that a physical 3-D trackball cannot be made with the entire top hemisphere of the ball exposed because of the requirement that a sensor be on the equator. Other similar techniques require multiple inputs from the 2-D input device. The first input defines a reference point or rotation axis. The next input defines the rotation with respect to the first input. Several iterations of the two steps are sometimes required. This approach can be esoteric and cumbersome even for design engineers, and is generally not attempted by naive computer users.

A third approach is to supplement the two inputs from a standard 2-D input device with a third input from an auxiliary electromechanical transducer. U.S. Pat. No. 4,933,670 to Nicholas C. Wislocki (Jun. 12, 1990) describes a 2-D trackball supplemented by inputs from a third, auxiliary transducer actuated by a rotating ring on the top of the ball. This auxiliary ring considerably increases the mechanical complexity of the device and obstructs a portion of the ball surface. U.S. Pat. No. 5,132,672 to Michael R. Clark (Jul. 21, 1992) describes a 2-D trackball supplemented by inputs from a third auxiliary transducer actuated by a conveyor belt or a cylindrical roller. Again, the auxiliary transducer adds considerable size and complexity to the device. Furthermore, an auxiliary transducer artificially distinguishes the third component of input from the other two. Imposing this distinction upon otherwise comparable components of rotation or translation can be confusing and counter-intuitive to the user of the device.

A fourth approach is to use force and torque inputs rather than rotations. Tracking devices measuring force and torque are described in U.S. Pat. No. 4,811,608 to John A. Hilton, issued (Mar. 14, 1989) and in the literature describing the "Spaceball" input device made by Spaceball Technologies, Inc.

The use of torque and force quantities introduces new barriers to the intuitive and natural input of data. For example, a standard trackball effects rotations on an object in the computer by directly rotating the ball. It effects translations on an object by directly translating the surface of the ball. (Translating the surface is in fact equivalent to rotating the ball, but it can be useful to think in terms of translations when translations are being effected.) In contrast, the same rotations and translations must be effected indirectly through forces and torques in the Spaceball. These difficulties become even more apparent when considering the reversal of such a motion. To reverse a motion using a trackball, the velocity-time integral (distance travelled) must be reversed. This merely requires a user to bring his thumb back to its initial position, which can be done easily and accurately. In contrast, to reverse a movement using the force-based tracking device, the force-time integral (impulse) must be reversed. In a torque-based tracking device, the torque-time integral (rotational impulse) must be reversed. Integrating these quantities (which can have two or three components) with respect to time is neither intuitive nor easily quantifiable. Thus, force- and torque-based tracking devices present obstacles to the intuitive, accurate, and reproducible input of data.

The article "Tablet-based Valuators that Provide One, Two, or Three Degrees of Freedom" by K. B. Evans, et. al. in Computer Graphics, V 15, No. 3 (Aug. 01, 1981) describes the need for "kinesthetic correspondence", that is, a direct and natural relationship between the hand motions and the corresponding rotations about the three axes. The current invention provides such a direct and extremely natural correspondence between the hand rotating a ball and the rotations about the three axes, and therefore fulfills this long-felt need.

OBJECTS AND ADVANTAGES

Accordingly, it is an object and advantage of this invention to provide an improved trackball device for the input of three-dimensional signals into a computer system.

It is a further object of this invention to locate the rotational sensors of this trackball in a hemisphere below an equator and to provide a method to transform the signals corresponding to measured rotations of the ball about arbitrary axes into signals corresponding to rotations about Cartesian (x, y, and z) axes.

It is a further object of this invention to provide tapered rollers to these rotational sensors to allow for a compact design and allow for sensors for all three rotations to be mounted on a single planar circuit board.

It is further object of this invention to use a nonplanar, saddle-shaped retaining ring and thereby expose a large portion of the ball surface such that a ball restricted to a given diameter can provide a larger surface area through which the user can continuously manipulate it.

It is a further object of this invention to expose this large area in adjacent quadrants, such that a user's thumb can actuate the ball from a larger range of angles, enabling more comfortable use of the trackball, and enabling greater flexibility as to the location of the trackball relative to the user's hands.

It is a further object of this invention to provide a method of transforming the rotations measured about substantially arbitrary axes to rotations about the standard Cartesian axes.

It is a further object of this invention to provide a method to quantify the accuracy of these transformed measurements.

It is a further object of this invention to transform 3-D rotations into 2-D rotations, so that a 3-D trackball can also function as an improved 2-D trackball in order that the single trackball is compatible with both 2-D and 3-D software. Furthermore, the transformed 2-D signals from the 3-D trackball make it functionally equivalent to both the front-mounted and top-mounted standard 2-D trackball.

It is a further object of this invention to locate this trackball in a portable computer base, so that the front face of the ball can be adjacent to the front face of the portable computer base, and the top face of the ball can be adjacent to the top face of the portable computer base.

It is a further object of this invention to integrate this trackball into the front edge of a standard keyboard, so that the advantages afforded by this design can be realized without using any additional space or adding any new components to the computer system relative to commonly known trackballs.

It is a still further object of this invention in a separate embodiment to allow a user to impart rotation about the x- and y-axes, the x- and z-axes, and the y- and z-axes by translation (sliding) exposed z, y, and x faces of the ball.

It is a further object of this invention to provide this improved trackball using a simple design which can be easily and inexpensively manufactured and can fit into a compact enclosure. Accordingly, in this design the three rotational sensors can be of the same type, can be of the standard electromechanical type, and can be located in a nearly arbitrary manner to facilitate ease of manufacture and compactness. The corrections for the nonorthogonal measurement directions which result are compensated by a transformation procedure which can be very inexpensively incorporated into the software device driver.

It is a further object to provide a rotational sensor with a simplified mounting and with reduced rotational friction.

It is a still further object of this invention to provide flexibility in the placement and orientation of the rotation sensors.

It is a yet further object of this invention to:
a) provide an optical method of measuring ball rotation in a mouse or trackball;
b) give very accurate measurements of ball rotations;
c) allow flexibility in the location of optical rotation sensors;
d) provide a pattern for very accurate measurement of surface motion on a ball;
e) facilitate devices with balls as large as possible to allow smoother, more accurate, and more reliable movement over rough and dirty surfaces.

This invention enables the intuitive, accurate entering of both 2-D and 3-D rotation signals through rotation of a single ball. It provides a very direct and intuitive manner for entering 3-D rotations into a computer, namely, by performing those 3-D rotations on the ball. It enables all of these signals to be entered by the single thumb of a user.

Still further objects and advantages will become apparent from a consideration of the ensuing description and accompanying drawings.

SUMMARY

A trackball includes a ball retained in a receptacle by a retainer which exposes for manipulation a free area extending over an arc greater than 180 degrees over the ball surface. The trackball has sensors which generate signals corresponding to the rotation about a set of ball axes and a means to generate transformed signals corresponding to rotation about a second set of axes. A tapered roller on a rotating sensor allows the sensor to sense rotations about a ball axis not necessarily parallel to the sensor axis. A method is given to generate a transform signal whose components correspond to rotations about orthogonal axes, where the transform signal is based on rotation measurements about non-orthogonal axes. A sensor has bearings which support a roller shaft at its ends and one of which is spring-loaded to maintain frictional contact between the roller and ball.

A method is developed for projecting the regular polygons from the surface of Platonic solids onto the surface of a sphere. These projected shapes provide a regular and very accurate method to fix the location and the movement of the surface of the ball in a mouse and trackball. A method to divide these polygons into arbitrarily smaller triangles enables further precision in measurement. Combining these accurate measurements with a coordinate transformation method enables the design of a mouse and trackball with a more conveniently located sensor that facilitates a larger and more accurate ball.

BRIEF DESCRIPTION OF THE DRAWING

FIG. 3a is a perspective view of another preferred embodiment of the invention in which the support is tilted forward and mounted in the front portion of a keyboard.

FIG. 3b is a perspective view of a variation of the embodiment of FIG. 3a in which two areas of the ball are exposed.

FIG. 4 is a rear view of the embodiment shown in FIG. 3a in partial section showing the locations of the rollers.

FIG. 5 is a side view of the embodiment shown in FIG. 3a in partial section showing the manner of contact of a tapered roller.

FIG. 6 is a detailed top view of an alternate, symmetric location of the tapered rollers with the embodiment shown in FIG. 3a.

FIG. 7b is an enlarged front view of a shaft end bearing of the measurement sensor of FIG. 7a.

DESCRIPTION

Figure 1:
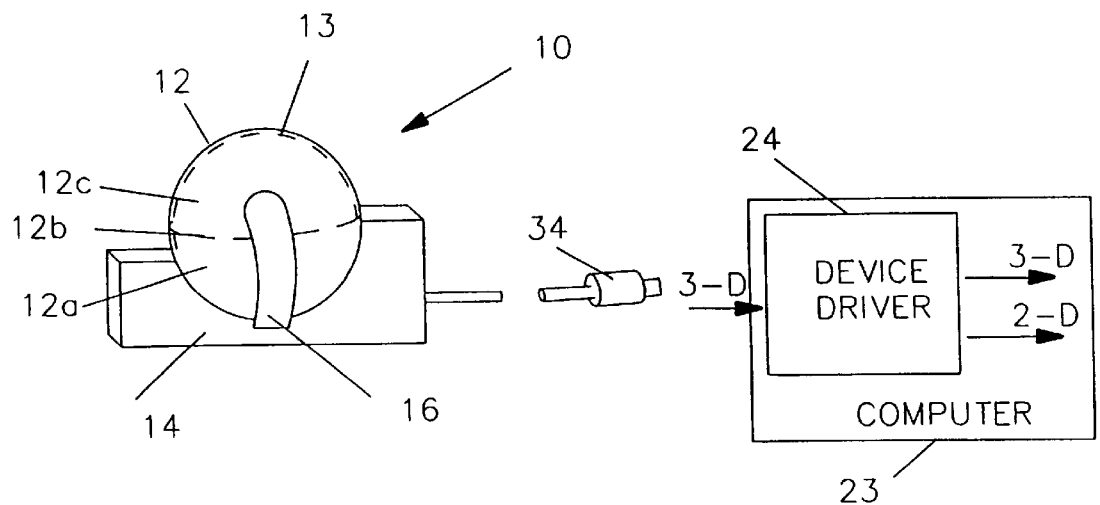
FIG. 1 is a perspective view of a preferred embodiment of the current trackball invention.
Figure 2:
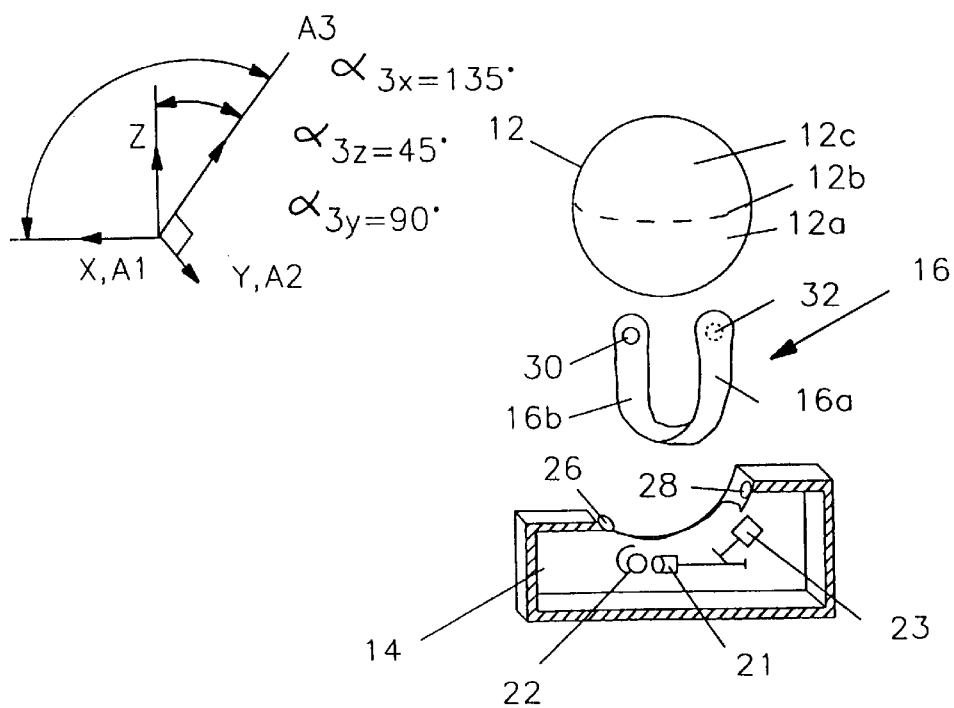
FIG. 2 is an exploded view in partial section of the embodiment of claim 1, which shows the location and orientation of the measurement sensors and the location of the ball supports.

Referring now to FIGS. 1 and 2, the improved trackball may be better appreciated.

A trackball 10 comprises a ball 12, a support 14, a retainer 16, three electromechanical sensors 21, 22, and 23, and a set of four low-friction pads 26, 28, 30, and 32 attached to support 14 and to retainer 16. The combination of support 14 and pads 26 and 28 form a receptacle which is sized to hold the ball. The combination of pads 26, 28, 30, and 32 support and contain (retain) ball 12 within the support members 14 and 16 of trackball 10, and allow rotation of the ball 12 with respect to the trackball 10. A pair of arms 16a and 16b of retainer 16 extend over a first hemisphere 12a, across a great circle 12b, and over a second hemisphere 12c. Trackball 10 can be connected to a suitably configured port on a computer via a cable and connector 34 and can be used in conjunction with standard buttons in any convenient location.

Because a free area with an angle of greater than 180 degrees, such as great circle 13, of the surface of ball 12 is available for the user to grasp, the retainer arms 16a and 16b may be made sufficiently flexible to enable the user to pull ("snap") the ball in and out of position for periodic cleaning. This obviates the need for a complex and bulky engagement and disengagement mechanism. The retainer arms 16a and 16b should also be sufficiently stiff to retain the ball and maintain the physical integrity of the ball and trackball under reasonably expected shocks and forces imparted to the ball 12 by the user during its use.

The three rollers 21, 22, and 23 frictionally engage ball 12 and are attached in the standard manner to rotational sensors of the standard electro-optomechanical type (not shown), which generate signals that correspond to the degree of rotation of the ball 12.

In conjunction with a computer 23, a software device driver 24 receives these signals sent by the sensors 21, 22, and 23 via connector 34. The software device driver 24 may be a program resident in the computer memory which may scale and transform the measurements. The software device driver 24, in turn, generates a signal that can correspond to translational and/or rotational coordinates, or to a cursor position on the screen. The software device driver 24 makes these transform signals available to programs running on the computer, and may allow these programs to switch the transformation of the signals from 3-D to 2-D.

Low friction pads 26, 28, 30, and 32 support and contain ball 12 in the preferred embodiment. Alternately, rollers 21, 22, and 23 could also support ball 12. However, this introduces the design constraint that there must be a single common location for both the support member and the rotation sensor. Furthermore, a ball supported by frictionally engaged rollers tends to align its rotation with the rotation of one of the rollers. Once so aligned the static coefficient of friction must be overcome to break the tractional engagement between the roller and ball. In contrast, a pad support introduces no such preferential directions. An additional advantage of pads is that their compactness allows for great flexibility in locating them in a given design.

In describing the rotational axes of ball 12 and the locations of the other trackball components, it is most useful to orient the coordinate system with respect to a stationary frame of reference, rather than with rotating ball 12. Accordingly, in the mutually orthogonal Cartesian axes in FIGS. 1 and 2, the z-axis is vertical, the y-axis is aligned parallel to the longer dimension of the retainer 16, and the x-axis is aligned parallel to the longer dimension of the housing 14. The coordinate origin is at the ball 12 center. In this embodiment, the bottom hemisphere of a stationary sphere that coincides with the surface of the ball 12 (z<0) is defined as a first hemisphere 12a, the top hemisphere (z>0) as a second hemisphere 12c, and the great circle at z=0 as an equator 12b.

Referring to FIG. 2, in this preferred embodiment roller 21 is located near the bottom (negative z extreme) of ball 12. Its axis of rotation is parallel to ball axis A1 (the x-axis), and it rolls along a meridian of ball 10 at x=0, generating a signal that corresponds to the rotation of ball 10 about the x-axis. Roller 22 is located at a position forward and slightly above roller 21. Its axis of rotation is parallel to ball A2 (the y-axis), and it rolls along a meridian of ball 10 at y=0, measuring the rotation of the ball 12 about the y-axis. However, contrary to the comments in U.S. Pat. No. 5,019,809, in this invention the third sensor 23 is not required to be located at the equator (z=0), in order to measure the third component of rotation. Its axis is parallel to the A3, which is not parallel to the z-axis. The measurement axes A1, A2, and A3 are "nonorthogonal", by which it is meant that they are not mutually orthogonal, so that the relative angle between at least one pair of axes is not 90°. The rotation of the ball 12 about the orthogonal Cartesian (x-y-z) axes can be determined indirectly from the combination of nonorthogonal rotation measurements using a transformation procedure described below. This permits all three sensors to be clustered in a region located away from the exposed surface of the ball, and thereby allows for a large portion of ball 12 surface to be exposed to the user's fingers for manipulation.

In typical current art trackballs, the ball is retained in the housing by a generally circular and planar retaining ring. In order to contain the ball, the diameter of the circular retainer must be less than that of the ball and the ball is trapped between the ring and the rest of the trackball apparatus. Therefore, the exposed portion of the ball is confined within a portion of a hemisphere of the ball protruding through the retainer, which is less than a full hemisphere. In contrast, the current invention uses a nonplanar retainer 16, with which the exposed area of the ball can extend far beyond the bounds of a hemisphere. This allows a greatly increased portion of the surface of ball 12 to be exposed. When used in combination with three sensors 21, 22, and 23 clustered as described above, this extended area can be exposed even in a fully 3-D trackball.

This has several very important new implications. First, the increased solid angle of the sphere exposed enable the ball 12 of a given diameter to have increased exposed area. Second, the exposed area can be accessed from a range of angles. Third, all three rotations can easily be imparted to the ball by a single finger of the user. Fourth, the abundant exposed ball area and the flexibility in sensor location allow this design to be used in novel configurations and applications. The compactness, simplicity, and ease of manufacture of this design should enable it to be routinely included in keyboards and in laptop computers.

Another preferred embodiment, which uses a tapered roller, is described in FIGS. 3–5. FIG. 3a shows a trackball 36 mounted in the front edge of a computer component housing such as a laptop computer base or a keyboard 38. The top (greater z) and front (greater x) surfaces of ball 12 are exposed and the second hemisphere is tilted in the x-direction (toward the user). The top of ball 12 is generally flush with or slightly above the top surface of keyboard 38, and the front of ball 12 is generally flush with the front of keyboard 38. Two arms 16a and 16b retain ball 12. The arms 16a and 16b may be shaped to smoothly blend in with the top and front surfaces of keyboard 38, so that the perimeter of the cavity in keyboard 38 through which the ball 12 protrudes is saddle-shaped. Buttons 42 and 44 are adjacent to ball 12 so that they are also easily accessible by the user's thumbs while typing. Like ball 12, buttons 42 and 44 have surfaces oriented to respond to contact from the thumbs from the top, front, or from any angle between.

FIG. 3b shows a variation of FIG. 3a in which retainer 16 forms a continuous bridge across the ball and provides two distinct exposed areas of the surface of ball 12.

The embodiment of FIG. 3a is shown in rear and side section views in FIGS. 4 and 5, respectively. Rollers 46 and 49 and tapered roller 48 are all oriented with all three roller axes of rotation parallel to a circuit board 50. This simplifies the manufacture of the design. Fully 3-D rotation signals can be produced by these rollers as described below.

In response to rotation of a body about a given rotation axis, a point on the body's surface moves normal to that rotation axis. Where the surface of body is symmetric about the rotation axis (such as in a circular cylinder or tapered circular cylinder), that motion is also tangential to the surface.

Typically a rotation sensor has such an axisymmetric circular cylinder (roller) frictionally engaged with the ball of a trackball. The ball contacts the cylinder in a small area about a contact point. In absence of a surface contour discontinuity (such as a cusp), the tangent planes of the ball and cylinder surfaces overlap at the contact point. The roller surface is constrained to move in a direction perpendicular to its roller axis, and measures ball movement in that direction. Thus, the roller measures ball rotation on a great circle passing through the contact point and whose tangent at the contact point is perpendicular to the roller axis.

Referring now again to FIGS. 4 and 5, standard cylindrical roller 46 responds to rotations about the y-axis. Tapered roller 48 responds to motion of the surface of ball 12 along great circle 51, which passes through contact point 54 and whose tangent is out of the page and normal to a roller axis 47 of roller 48 at contact point 54. The translational motion of the ball surface that is measured at the contact point 54 is in the y-direction (out of the page). As seen in FIG. 5, contact point 54 is located 45 degrees below the center of ball 12 so that the great circle 51 is oriented normal to ball axis A3. Thus, the motions measured by tapered sensor 48 along great circle 51 correspond to ball rotations about ball axis A3. The kinematics of such rotating bodies are described in "Kinematics and Dynamics of Machines", by G. H. Martin.

Using the signals from two of the sensors enables trackball 36 of FIGS. 3–5 to be compatible with standard 2-D trackballs of the current art. Rotation signals generated by sensor 46 correspond directly to rotations about the y-axis of a standard trackball. Rotations about either the x or z-axis cause tapered sensor 48 to generate signals which can be interpreted as rotations about the x-axis of a standard trackball. Thus, both 2-D components of rotation can be imparted to the rollers by sliding either the top surface or the front surface of the ball.

Thus, in contrast to a standard roller, tapered roller 48 is capable of sensing rotations about an axis which is not parallel to its own axis. In this way, all three rollers 46, 48, and 49 can be mounted parallel to circuit board 50, even though the rotation measured by roller 48 is about a a ball axis which is not parallel to circuit board 50. As will be described below, fully 3-D rotational signals can be generated from the three sensors, all of which can be mounted parallel to a single circuit board using the simple coplanar mounting techniques used in current 2-D trackballs. The taper is needed because the transformation analysis below will show that three nontapered rollers whose roller axes were parallel to a single plane result in a matrix that could not be inverted (i.e., is singular). The novel use of tapered roller 48 to measure a component of ball rotation out of the plane of circuit board 50 makes 3-D measurements possible using three sensors whose roller axes are parallel to a single plane.

Figure 6:
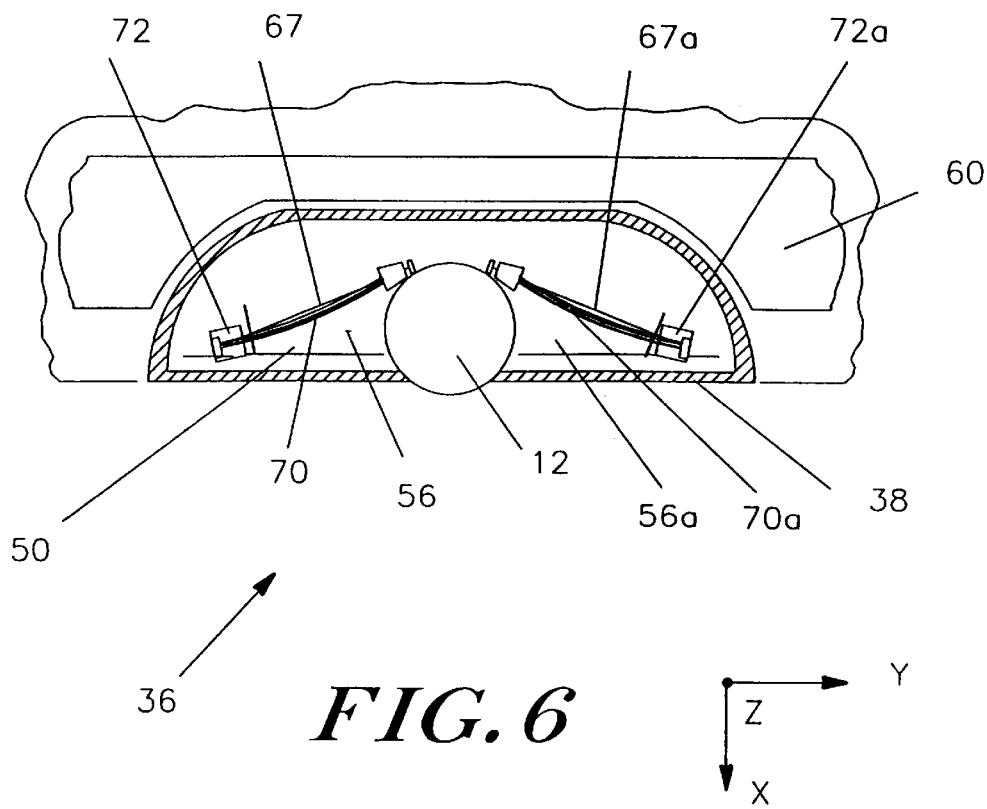

FIG. 6 shows an alternate preferred embodiment with tapered rollers. Sensors 56 and 56a are of the same design and are mounted symmetrically on opposite sides of an x-z plane, so that the entire trackball assembly 36 is elongated and mounted adjacent to the front edge of keyboard 38. The flexibility afforded by the use of the tapered rollers combined with the transformation method enables trackball 36 to be laid out in a compact configuration appropriate for the geometrical constraints of the particular mounting. In this mounting, sensors 56 and 56a can fit into a normally unused space beneath and in front of a spacebar 60 (toward the user). In current art trackballs, the orthogonally mounted sensors preclude such a design.

Figure 7A:
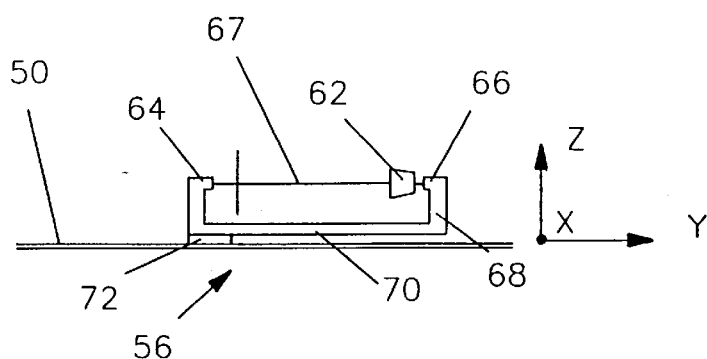
FIG. 7a is a detailed front view of one of the measurement sensors, including the tapered roller, shaft, and end bearings.

Referring to both FIGS. 6 and 7a, a distal (to the ball) end 72 of a spring member 70 of sensor 56 is attached to circuit board 50. Spring member 70 and a strut 68 provide cantilevered support of bearing 66. Together with bearing 64, these components form the shallow "U" configuration of FIG. 7a.

Spring member 70 is of rectangular cross-section, and substantially thicker in its z-dimension than in its x-dimension. The thicker z-dimension results in spring member 70 being very stiff against bending and movement in the z-direction. As a result, there is very little tilting of strut 68, and very little movement of bearing 66 in the axial (z) direction. Spring member 70 acts as a rigid clamp which contains shaft 67.

In contrast, the x-dimension of spring member 70 is smaller, which reduces the stiffness against its bending in the x-direction. This bending in the x-direction of spring member 70 allows for movement in the x-direction of cantilevered strut 68 and bearing 66. This flexure in spring member 70 is used to apply a radial preload force between roller 62 and ball 12 even when ball 12 shifts. The need for a separate spring to apply this force is obviated.

Figure 7B:
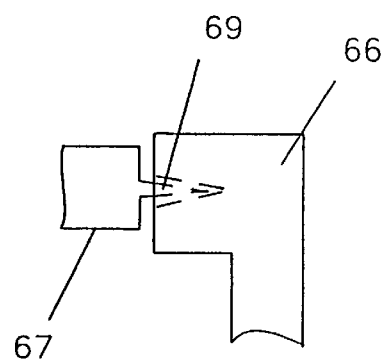

FIG. 7a details sensor 56 with a tapered roller 62. Bearings 64 and 66 contain and support both the axial thrust and a radial preload force on roller 62. The shaft is of larger diameter in its central portion to maintain stiffness and provide more area for attachment of roler 62. One end 69 of a shaft 67 detailed in FIG. 7b is typical of the reduced diameter of the ends of shaft 67 within its supporting bearings 66 and 64. As a result, the frictional force resisting rotation of shaft 67 inside bearings 64 and 66 acts with a lesser moment arm, resulting in a lower frictional torque. The cavity in bearing 66 is of slightly larger diameter than the reduced diameter of shaft end 69 to enable a tilting between shaft end 69 and the cavity in bearing 66 during flexure of spring member 70.

An additional advantage of a tapered roller such as tapered roller 62 is compactness. In current art sensors, the roller is usually connected via a shaft to an optical sensing wheel of larger diameter. The roller and shaft are parallel to the ball surface. Therefore, a long shaft connecting the roller and sensing wheel is required to prevent interference between the sensing wheel and the ball. In contrast, with tapered rollers, the shaft generally can point away from the ball. The shaft need not be as long to allow the sensing wheel to clear the ball surface.

Figure 8:
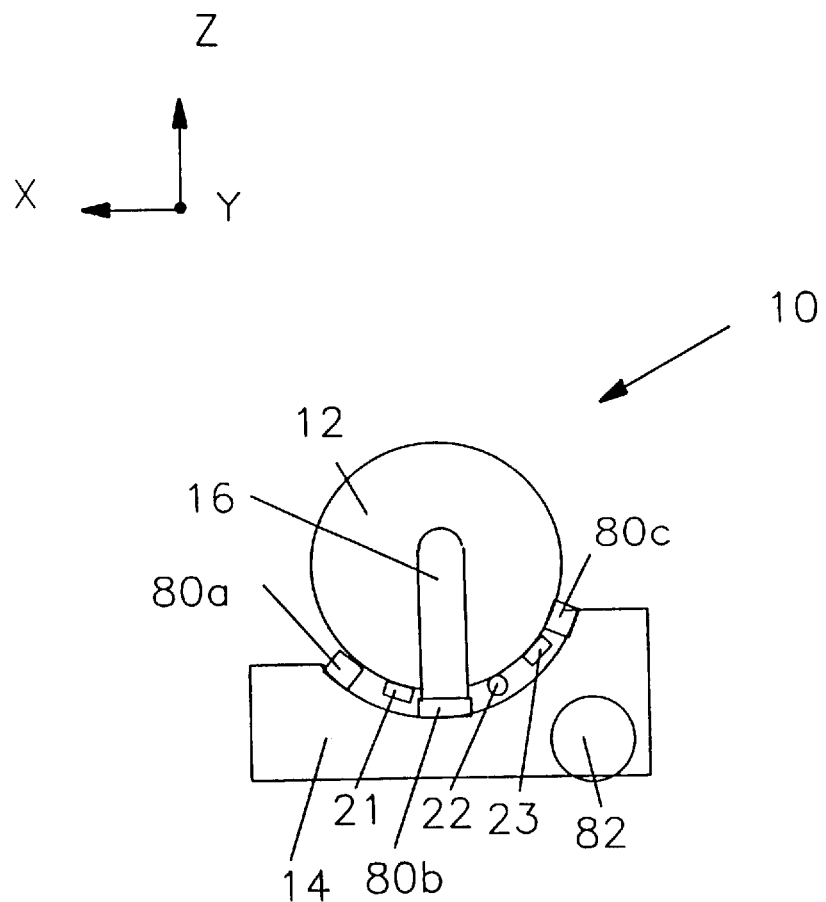
FIG. 8 is a side view of an embodiment of the invention which includes measurement of force and translation.

A last preferred embodiment is illustrated in FIG. 8. This embodiment combines the rotation of ball 12 described for the embodiment of FIG. 1 with a measurement of force and translation. Force sensors 80a, 80b, and 80c measure the force applied to the ball. Mouse ball 82 measures the translation of the trackball 10. Translation could alternatively be input using a trackpad or thumbwheel.

The means by which the various signals generated by the clustered rollers are processed is now discussed. The object of this procedure is to convert the signals generated by rollers of substantially arbitrary orientation into signals corresponding to rotations about the standard Cartesian axes. This is accomplished by first generating influence factors for the transformation and second by using these influence factors to transform the signals.

Referring to FIG. 2, rollers 21, 22, and 23 respond to rotations $R_1$, $R_2$, and $R_3$ (components of the vector quantity $R_r$) about first, second, and third ball axes A1, A2, and A3, respectively. In the simplest case these ball axes are mutually orthogonal and coincide with the x, y, and z (Cartesian) axes. In this simple case the rotations correspond simply to the rotations $R_x$, $R_y$, and $R_z$ (components of the vector quantity $R_x$). However, this is not necessary. In fact, as will be shown below, all three Cartesian components of rotation can be deduced from a set of rotations measured about any three axes that are linearly independent (i.e., three axes which are not oriented parallel to a single plane). The rotations from these three linearly independent ball axes can also be transformed into rotations about any other fourth, fifth, and sixth ball axes.

The rotational velocities about each roller axis that will arise due to rotations about each Cartesian axis can be directly measured. Equivalently, the rotations can be calculated as the direction cosines $C_{ij}$ of each ball axis with respect to each Cartesian axis ($C_{ij}$=cosine($a_{ij}$)). For example, in FIG. 2 the angle of ball axis A3 with respect to the z-axis ($a_{3z}$) is 45 degrees, so that for the embodiment of FIG. 3, $C_{1z}$=cosine (45 degrees)=0.707. The resulting equations are:

$$R_1 = C_{1x} R_x + C_{1y} R_y + C_{1z} R_z$$
$$R_2 = C_{2x} R_x + C_{2y} R_y + C_{2z} R_z$$
$$R_3 = C_{3x} R_x + C_{3y} R_y + C_{3z} R_z$$

or, in matrix and vector form, $$R_r = C\, R_x$$

However, in the operation of a trackball, the inverse problem must be solved. In operation, the sensor output signals $R_I$ are known and are used to generate signals that represent the rotation of ball 12 about the Cartesian axes $R_x$. This problem can be solved using the inverse of C:

$$R_x = C^{-1} R_I$$

The inverse of C exists only when the three rows of C are linearly independent. This corresponds physically to the situation where all of three of the sensing axes A1, A2, and A3 which do not share a plane. Measurement errors scale with the a parameter of the matrix $C^{-1}$ known as the "stiffness". The stiffness is defined as the quotient of the maximum eigenvalue over the minimum eigenvalue, $$\lambda_{max}/\lambda_{min}$$

This can be illustrated with two simple examples.

In the case in which the measuring axes are coincident with the Cartesian axes, the direction cosine matrix is the identity matrix, in which all off-diagonal matrix elements are zero:

$$C = \begin{vmatrix} 1 & 0 & 0 \\ 0 & 1 & 0 \\ 0 & 0 & 1 \end{vmatrix}$$

The inverse of C, $C^{-1}$ is also the identity matrix, which has the eigenvalues [1,1,1], and a resulting stiffness of 1.

A slightly more complex case is shown in FIG. 2. $R_1$, $R_2$, and $R_3$ are the rotations about axes A1, A2, and A3, respectively. Sensor 23 is skewed by an angle of 45 degrees below the z plane, so that its axis of rotation A3 is in the x-z plane, midway between the z and negative x axes. The entries in the third column of C are then:

$$C_{3x} = \cos(a_{3x}) = \cos(135°) = -0.707$$

$$C_{3y} = \cos(a_{3y}) = \cos(90°) = 0$$

$$C_{3z} = \cos(a_{3z}) = \cos(45°) = 0.707$$

so that C becomes:

$$C = \begin{vmatrix} 1 & 0 & 0 \\ 0 & 1 & 0 \\ -.707 & 0 & .707 \end{vmatrix}$$

and its inverse becomes:

$$C^{-1} = \begin{vmatrix} 1 & 0 & 0 \\ 0 & 1 & 0 \\ 1 & 0 & 1.414 \end{vmatrix}$$

The eigenvalues of $C^{-1}$ are [1,1,1.414], so that the resulting stiffness is 1.414. The eigenvalues and inverse of the matrices may be calculated using standard linear algebra procedures, or may be computed using a commercially available matrix package such as Macsyma™, available from Macsyma, Inc. of Arlington, Mass.

This stiffness of the matrix quantifies the sensitivity of the output of the transformation steps to errors in the input signal. In this simple 45 degree skewing case, this can be also be seen by noting that the equation for the x and y rotations are directly measured ($R_x = R_1$; $R_y = R_2$) and that $R_z = R_1 + 1.414 R_3$, so that the signal (and its errors) in measuring $R_3$ are in fact amplified by a factor of 1.414 in $R_z$.

In view of the fact that typical rotation sensitivities of trackballs are measured in thousandths of an inch, this transformation error is not significant in comparison to that introduced by the human hand. The amplification of errors introduced by drag in the rotation of the rollers is also be small when the rollers have low-friction bearings which introduce little resisting torque to imposed rotations and allow the rollers to roll freely.

If desired, the tendency in some current trackballs for the ball rotation to become preferentially aligned with an orthogonal roller axis can be reproduced from the signals from nonorthogonal signals. For example, a second transformation could be applied to the transform signal corresponding to the Rx, Ry, and Rz rotations. This second transformation may use a rule that if Rz is less than 10% of Rx and Rz is less than 10% of Ry, set Rz to zero. This allows the user to manipulate x and y components data and avoid unintended drift of the z component.

Figure 9A:
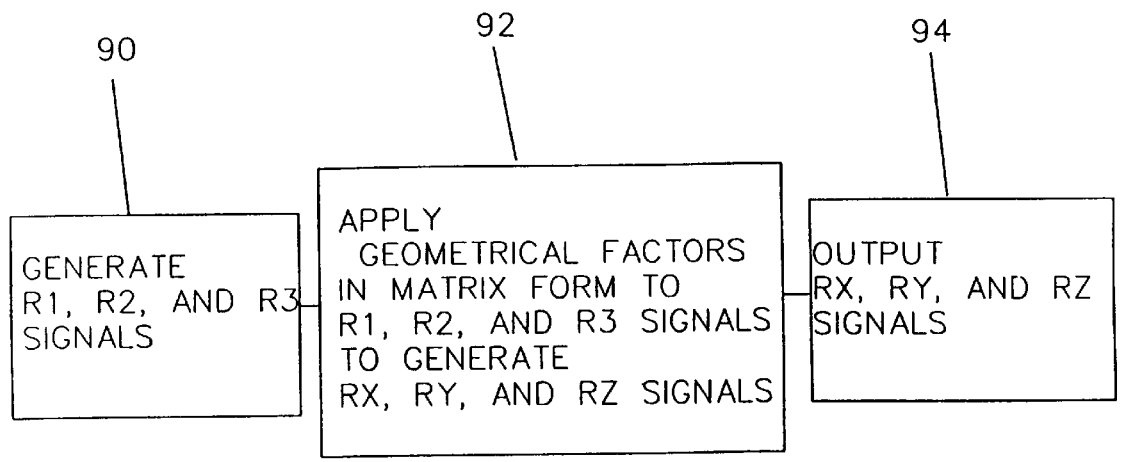
FIG. 9a is a flow chart describing a method of processing signals generated by nonorthogonal measurement sensors.

This transformation method is summarized in the block diagram of FIG. 9a. Signals R1, R2, and R3 representing rotations about a set of nonorthogonal axes are generated from the sensors in step 90. In step 92 the signals are transformed to rotations about a second set of axes which usually are mutually orthogonal. This transformation is based on factors relating the geometrical orientation beween the two sets of axes as described above. In step 94, new signals corresponding to the rotations Rx, Ry, and Rz about the second set of axes are output.

Figure 9B:
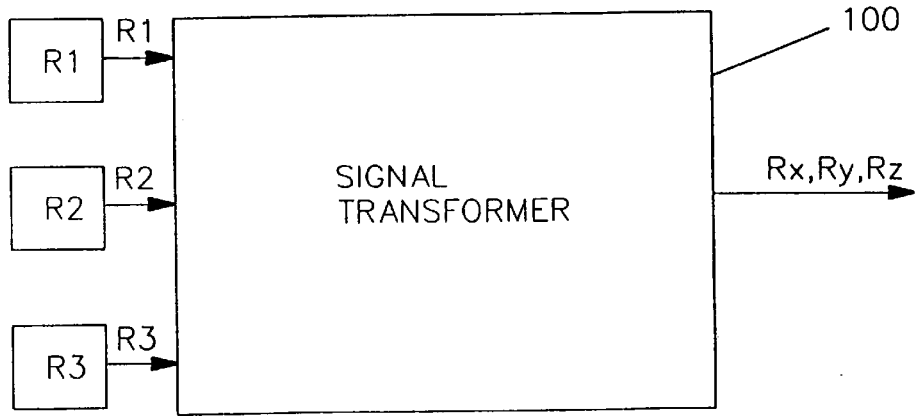
FIG. 9b is a flow chart detailing a method of processing signals within a dedicated microprocessor.

This procedure can easily be incorporated into the software device driver 24 in FIGS. 1 and 9b. It allows the rotation sensors to be located at points which can accommodate efficient ergonomic design and manufacturability. The procedure has been reduced to a straightforward expression in linear algebra, so that it can provide the designer with insight as to the optimal configuration in the design of particular embodiments.

The implementation of this procedure in hardware is described in the block diagram of FIG. 9b. The three signals corresponding to rotation measurements R1, R2, and R3 are input into a dedicated microprocessor 100. The signals are converted to digital signals either within the measurement sensors or within the signal transformer. The transformations to measurement signals corresponding to rotations Rx, Ry, and Rz are performed by a microprocessor within the signal transformer 100. The signal transformer 100 may be integral with the trackball 10, so that the output signals produced from the trackball 10 would mimic those produced from a standard trackball with orthogonal sensors.

Figure 9C:
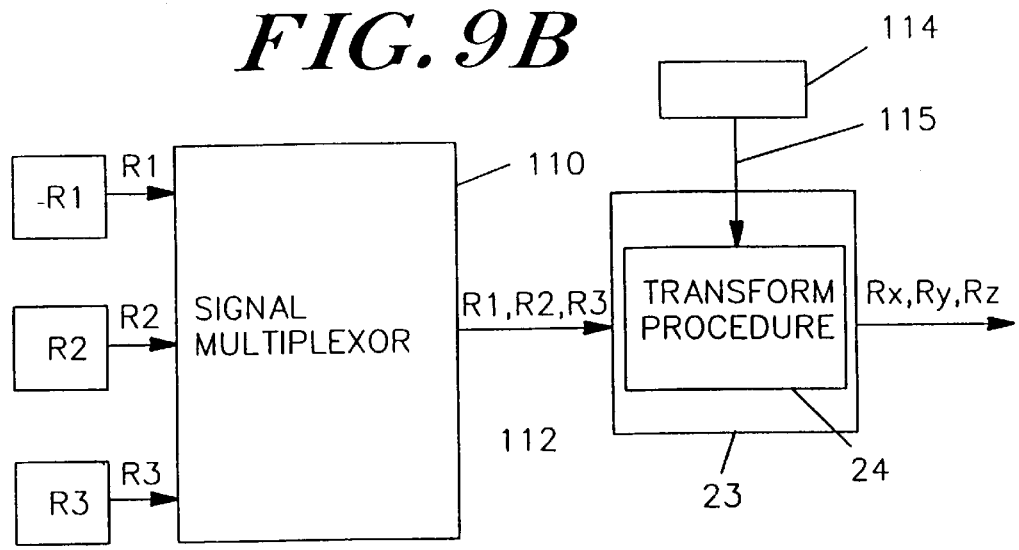
FIG. 9c is a flow chart detailing a method of processing signals using a device driver in a computer.

An alternate implementation of the transformation procedure is described in the block diagram of FIG. 9c. The three measurement signals corresponding to rotations R1, R2, and R3 may be first combined and made into digital signals in multiplexor 110. A combined signal 112 whose components correspond to R1, R2, and R3 may be passed along through a single communications channel. This combined signal 112 is passed into the computer 23. Influence coefficients 115 are retrieved from a location in memory 114, and the transformation procedure is performed on the combined signal 112 to produce the transform signals corresponding to rotations Rx, Ry, and Rz.

Where 2-D output is desired, the 3-D rotations can be reduced to 2-D rotations in several ways. For example, the signals corresponding to $R_x$ could be used verbatim as a signal corresponding to a (2-D) x rotation $R_{x2d}$, and the signals corresponding to $R_y$ and $R_z$ could be summed in the software driver 24 as a signal corresponding to a (2-D) y rotation $R_{y2d}$. The transformation which reduces 3-D rotations to 2-D would then be:

$R_{x2d} = C_{32} R_x$ where $$C_{32} = \begin{vmatrix} 1 & 0 & 0 \\ 0 & .707 & .707 \end{vmatrix}$$

for example. The specific values in $C_{32}$ can be viewed as scale factors and are somewhat adjustable.

Appropriate adjustment of the influence coefficients 114 in FIG. 9c enable the trackball 10 to mimic the operation of a top-accessible 2-D trackball when the top of ball 12 is manipulated, and mimic the operation of a front-accessible 2-D trackball when the front of ball 12 is manipulated. Alternately, the $R_y$ and $R_z$ rotation could be combined electronically in the signal transformer 100 in FIG. 9b. In a third alternative, a single roller such as roller 23 of FIG. 2 oriented at an intermediate angle between the negative x- and the z- axes together with a roller such as roller 22 oriented parallel to the y-axis could directly supply these 2-D signals.

This procedure allows for accurate measurement of 3-D rotations of a ball in which the sensors can be located almost arbitrarily. This facilitates the design of very compact and ergonomic trackballs that can be easily manufactured, such as those in the embodiments described above. This procedure facilitates the introduction of new and non-standard rotational sensors. For example, it may be desirable to use a sensor in which the cylindrical roller is tapered for ease of manufacture or to increase compactness of the trackball. In this case the coefficients in matrix C can be adjusted to reflect the influence of each of the rotations $R_x$, $R_y$, and $R_z$ on the tapered wheel. In fact these coefficients can be determined experimentally after manufacture in a calibration procedure by measuring the response of each sensor to each of a set of known rotations applied to the ball. For example, coefficient $C_{1y}$ would be the measured rotation of sensor 1 in response to a known rotation imposed about the y-axis. These measured constants in C can be entered into the software device driver 24 with no modifications to the electronic or mechanical manufacturing tooling for trackball 10. Thus, this procedure gives the ability to compensate for and correct hardware design errors through software. One can invest in tooling setups for novel and innovative hardware designs for which the influence coefficients are not known a priori, and measure these coefficients from the actual production trackballs. The coefficients can be changed a posteriori without expensive changes to the tooling setup for the design.

Detailed Description of FIGS. 10A–E

Platonic Solids

The Platonics solids are a class of solids which is convex (ball-shaped), has vertices which are all alike, and in which each face is a single kind of polygon. There are exactly five Platonic solids: the tetrahedron, the cube, the octahedron, the dodecahedron, and the icosahedron.

Each of the eight triangular faces 210 of the octahedron maps onto a region covering one-eighth of the sphere surface. The eight sections are bounded and separated by three mutually perpendicular planes. Each vertex 212 connects four triangles. When these triangles are mapped onto the sphere surface, the corners angles of each region increases from 60 to 90 degrees. Thus, the isosceles triangles are severely distorted in the mapping process.

Similarly, the four faces of the tetrahedron and eight faces of the cube require severe distortion of corner angles to map to a sphere surface.

Icosahedrons

Figure 10A:
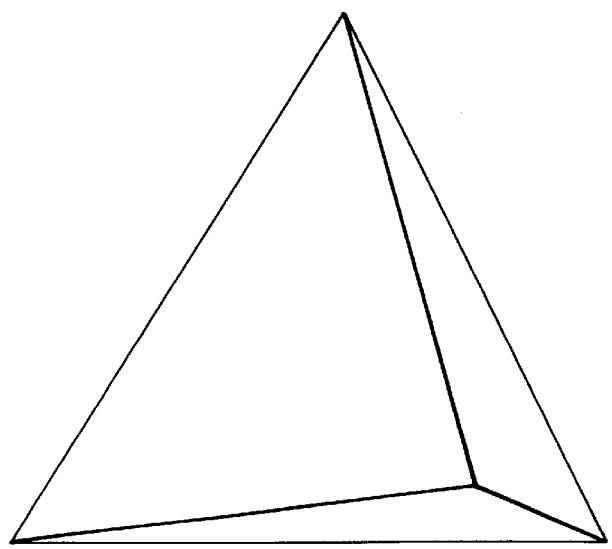
FIGS. 10 a–e shows the five Platonic solids: the tetrahedron, the cube, the octahedron, the dodecahedron, and the icosahedron, respectively.
Figure 10B:
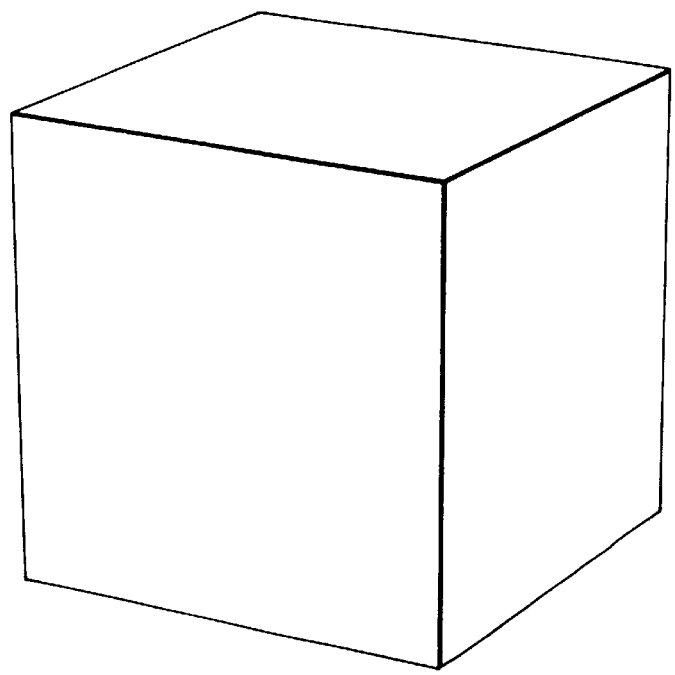
Figure 10C:
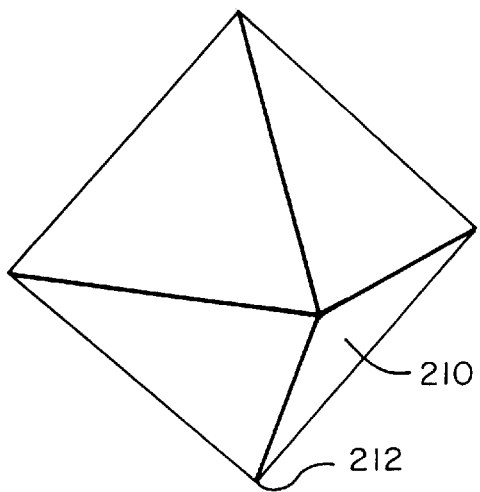
Figure 10D:
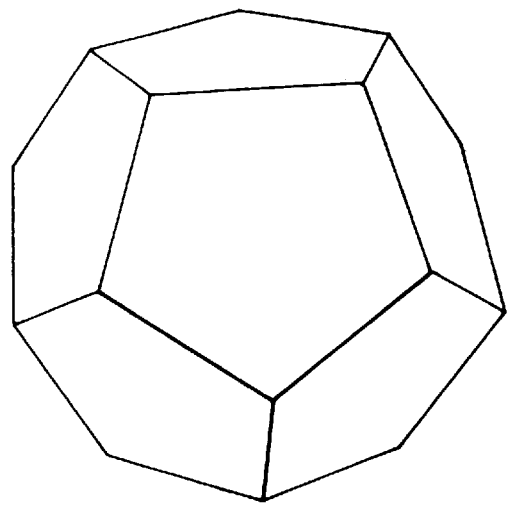
Figure 10E:
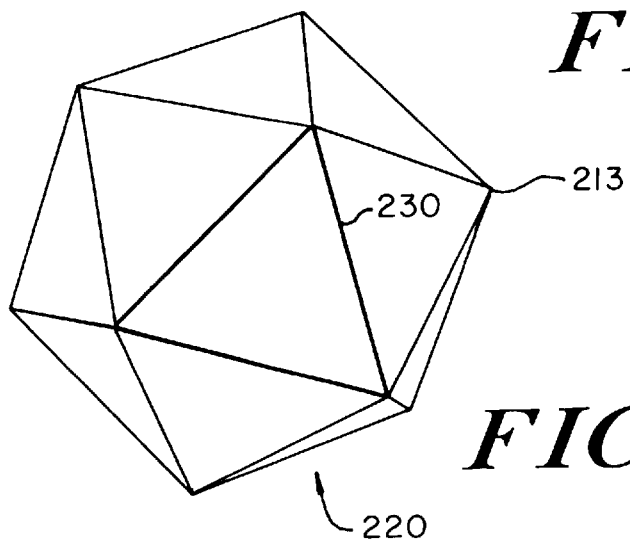

The basic icosahedron 220 shown in FIG. 10e has the greatest number of faces (20) of the Platonic solids. Each face is an isosceles triangle, and 5 faces meet at each of 12 vertices 213. Each face and each vertex is identical; the solid is completely regular and symmetric.

For a unit circle, the 12 vertices 213 are at the coordinates are listed in Table 200:

TABLE 200

| Coordinates of vertices 213 of an Icosohedron of Radius 1 | | | |
|---|---|---|---|
| Index | X | Y | Z |
| 1 | 0.000000 | 0.000000 | 1.000000 |
| 2 | 0.894427 | 0.000000 | 0.447214 |
| 3 | 0.276393 | 0.85061 | 0.447214 |
| 4 | −0.723607 | 0.525731 | 0.447214 |
| 5 | −0.723607 | −0.525731 | 0.447214 |
| 6 | 0.276393 | −0.850651 | 0.447214 |
| 7 | 0.723607 | −0.525731 | −0.447214 |
| 8 | 0.723607 | 0.525731 | −0.447214 |
| 9 | −0.276393 | 0.850651 | −0.447214 |
| 10 | −0.894427 | 0.000000 | −0.447214 |
| 11 | −0.276393 | "0.850651 | −0.447214 |
| 12 | 0.000000 | 0.000000 | −1.000000 |

Length of edges = 1.0541462

20 isosceles triangles define the faces 234 of the Icosohedron. For each face 234, the index of each vertex 213 is listed in Table 202. The order of the vertices 213 for each face is given in a counter-clockwise orientation as viewed from a point external to the icosohedron.

TABLE 202

| Face | Indices of Triangle Vertices | | |
|---|---|---|---|
| 1 | 1 | 2 | 3 |
| 2 | 1 | 3 | 4 |
| 3 | 1 | 4 | 5 |
| 4 | 1 | 5 | 6 |
| 5 | 1 | 6 | 2 |
| 6 | 2 | 7 | 8 |
| 7 | 3 | 8 | 9 |
| 8 | 4 | 9 | 10 |
| 9 | 5 | 10 | 11 |
| 10 | 6 | 11 | 7 |
| 11 | 8 | 3 | 2 |
| 12 | 9 | 4 | 3 |
| 13 | 10 | 5 | 4 |
| 14 | 11 | 6 | 5 |
| 15 | 7 | 2 | 6 |
| 16 | 12 | 8 | 7 |
| 17 | 12 | 9 | 8 |
| 18 | 12 | 10 | 9 |
| 19 | 12 | 11 | 10 |
| 20 | 12 | 7 | 11 |

Projection

The triangles on the surface of the icosohedron can be readily mapped onto a sphere surface (as in FIG. 11b), with little distortion and with the relatively modest change in the corner angles from 60 degrees to 72 degrees.

The mapping function which projects each point P on the surface of the icosohedron to the spherical surface is:

$P_x = P_x/\text{Radius}$ (0.1)

$P_y = P_y/\text{Radius}$ (0.2)

$P_z = P_z/\text{Radius}$ (0.3)

where Radius=sqrt$(P_x^2 + P_y^2 + P_z^2)$ (0.4)

This function maps the line segments 230 on the edges of the triangular faces 234 to curved line segments lying on the surface of the sphere.

Triangulation

Figure 11A:
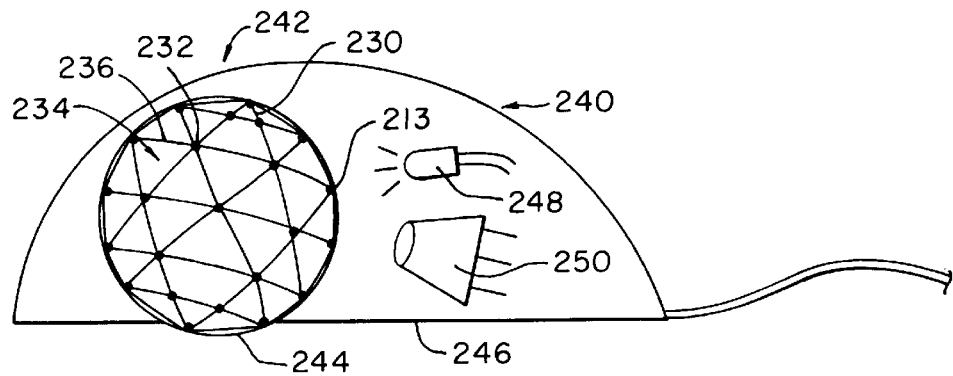
FIG. 11a shows a mouse using a ball with a surface pattern formed by an icosahedron with an optical sensor located beside the ball.
Figure 11B:
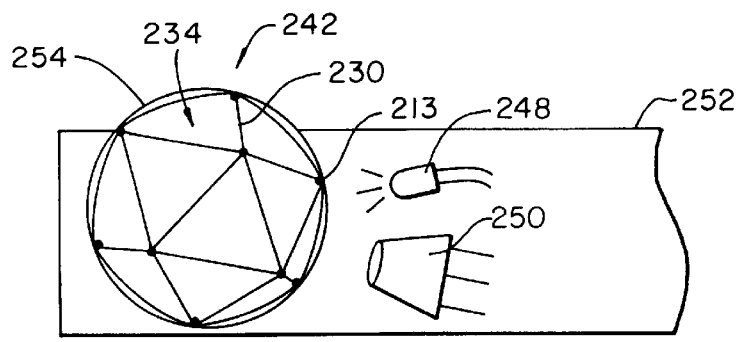
FIG. 11b shows a trackball using a ball with surface pattern formed by an icosahedron with an optical sensor located beside the ball.

FIG. 11b shows an icosohedron projected onto the surface of a ball. FIG. 11a shows an icosahedron whose surface is triangulated to a finer pattern of triangles and projected onto the surface of a ball.

In FIG. 11a, each edge 230 is bisected at a midpoint 232. In a given triangle 234 the midpoints 232 of the edges 230 are joined a line segment 236 (which will also is projected onto the sphere surface). Each isosceles triangular face 234 is split into four smaller isosceles triangular faces. Each of the 4 new triangles has a length and height ½ that of the original triangle.

The subdivided icosohedron retains a great deal of its regularity. Each of the new vertices 232 connect six triangles (as opposed to five for the vertices 213 of the icosohedron), so that triangles meet at the new vertices 232 with corners angles of 60 degrees (as opposed to 72 degrees where five triangles meet at the original vertices 213). All subsequent divisions create new vertices 232 at which the same number of triangles (six) with the same corner angles (60 degrees) meet.

This process can be done recursively to subdivide the triangles in a regular, well-defined manner for arbitrary number of subdivisions, for an arbitrarily fine mesh. An arbitrarily fine mesh is important because in many applications the triangles formed must be significantly smaller and more numerous than are available in any of the Platonic solids. The resolution of the device requires detection of rotation of the ball substantially smaller than the diameter of the ball itself. This is especially true if the rotation, rather than translation, is being measured at the detecting area of the surface of the ball.

The coordinates of a new vertex created at the midpoint of two other vertices can be calculated as the arithmetic average of the original vertices:

$(Pnew)x=((P1)x+(P2)x)/2$ $(Pnew)y=((P1)y+(P2)y)/2$ $(Pnew)z=((P1)z+(P2)z)/2$

Once the recursive division process is finished and all of the new vertices are created, the new vertices can be projected directly outward to the surface of the sphere by scaling the values (normalizing the distance vector) so that the final, scaled radius is 1:

$Radius=sqrt(P_x^2+P_y^2+P_z^2)$

Where the projection operator applied to a point P is:

$P_x=P_x/Radius$ (0.5)

$P_y=P_y/Radius$ (0.6)

$P_z=P_z/Radius$ (0.7)

The total number of vertices on the sphere surface for a surface on which n subdivisions were performed is $12\times2^n$. Each of the original 12 vertices joins 5 triangles and is at the intersection of 5 edges. Each of the new vertices formed by the subdivision joins 6 triangles and is at the edge of 6 edges.

The result is a network of vertices distributed in a well-defined, near uniform pattern over the sphere surface. The line segments forming the edges of the triangles are projected to the surface of the sphere to form great circle routes on the sphere surface. The points on the curves that forms the great circle routes are projected to the sphere's surface using the projection operator defined above.

Measurement

In one embodiment, the icosohedron is represented by the projections borne on the surface of the ball in thin line segments. The intersections of these line segments provides a "cross-hair" specification of the location of an intersection point. Given the well-defined pattern formed by the Platonic solid, The location of this intersection point can be more precisely measured by measurement of the locations of all of the line segments converging at the point and extrapolating to the intersection point.

Hybrid Platonic Solids and Other Surface Patterns

Hybrid Platonic solids can be constructed by relaxing the constraints. For example, by removing the requirement that only one kind of regular polygon be used, the family of solids that results we include herein as hybrids within the our definition of Platonic solids. These are called the Archimedean Solids (also called the semiregular solids), of which there are 13. An example of these solids is the "soccer ball" pattern.

Simplical complexes have a more general surface which is constructed as a conglomeration of simplex shapes. For a spherical surface three points define each simplex shape. The patterns generated from simplical complexes may be the line segments connecting the sets of three points, or they may be dots at each of the three points of each simplex.

For further detail on Platonic solids the reader is directed to "Polyhedron Models" by Magnus J. Wenninger, Cambridge University Press or to "Shapes, Space, and Symmetry" by Alan Holden, Columbia University Press.

Detailed Description of the Embodiments in FIGS. 11A and 11B

FIG. 11a shows a mouse enclosure 240 in which the ball 242 is used to measure translation of the mouse across a surface.

An exposed portion 244 of the ball 242 protrudes through a lower surface 246 of the mouse housing 240. Within the mouse housing an emitter 248 illuminates the surface of the ball and a detector 250 collects light reflected from the pattern in the ball surface.

FIG. 11b shows a trackball enclosure 252 which may be a portion of a laptop computer. A an exposed portion 254 of a ball 242 protrudes through a top and front surface of the trackball enclosure 252. The ball may measure two- or three-dimensional rotations imparted to it by a hand. An emitter 248 illuminates the surface of the ball 242 and a detector 250 collects light reflected from the pattern in the ball surface. The signals from the detector may be transformed to cartesian coordinates by the transformation procedure described above.

Measuring Methods

In the instant invention a device and method of measuring location on the two-dimensional surface of a three dimensional object is presented.

Measuring the position of a three dimensional object can require considerable resources. In order to measure arbitrary positions of the object, resolution is needed in each of two directions, and the number of sensing elements needed is the square of that needed in each direction. There is a corresponding savings in sensing elements needed if the resolution requirements can be reduced. For example, if the required resolution in a given direction is reduced by four, the total sensors needed is reduced by sixteen. Therefore, there it is highly desirable to extract the maximum amount of data from a given resolution.

Precision can be particularly important when a transformation such as that described above is to be applied to the raw measurements. Measurement errors can be amplified. This transformation may be used when the design constraints suggest that the sensor be located in a position at which it cannot directly measure rotation about an axis.

Figure 12:
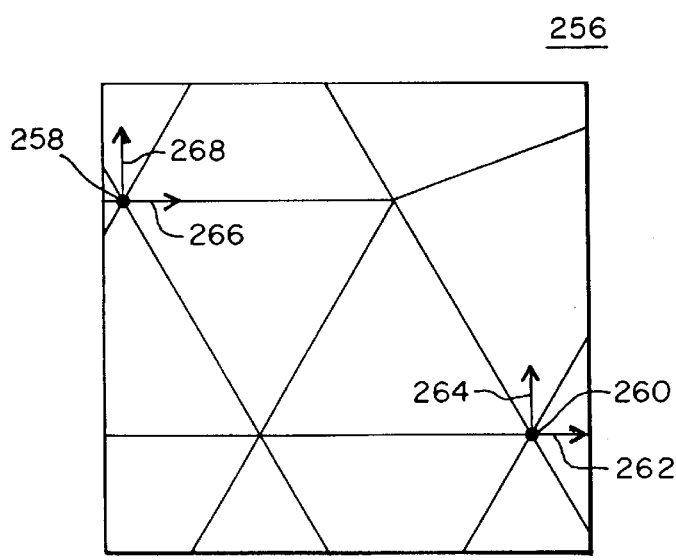
FIG. 12 shows the pattern projected on to the sensor and the velocity components measured.

FIG. 12 shows the image 256 of the pattern projected from the surface of the ball 242 onto an optical sensor 250.

The presence of a known pattern with readily identifiable features aids in the triangulation of those features to reproduce the location and orientation of the object.

A pair of spaced measurement points 258 and 260 are chosen. Each has two degrees of freedom. Two rotations of the sphere can be measured at each measurement point. For the measurement of full three dimensional rotations, both points are needed. From these two points 258 and 260, four measurements of translations 262, 264, 266, and 268 are recorded. There is an extra degree of freedom which is unphysical; the recorded two directions of motion cannot have relative motion of the two points toward or away from each other. They are a fixed distance apart on the sphere. This can be used as a consistency check on the measuring scheme.

The regular pattern of the triangular faces makes the exact location of the target "cross hairs", the intersection of lines at polygon corner more exact for a given pixel resolution. It ensures a consistent measurement error, and simplifies and makes more accurate the pattern recognition needed to accurately locate a point.

Alternately, the location and orientation of line segments can be measured. Aliasing can be applied to further increase the accuracy of detection of the position of line segments. Methods to increase the accuracy in determining the location of a line segment have been disclosed in U.S. Pat. No. 4,652,765, (1987), entitled "Edge detecting device in optical measuring instrument"

The magnification of the image onto the sensor should be low enough that at least one polygon is contained inside the measuring sensor. It should be high enough such that there are several pixels per polygon to ensure they can be resolved.

Transformations

The existence of a full pattern element on the screen allows for the measurement of two points in a spaced relationship. A transformation can be applied to the measured rotations to deduce the three-dimensional rotations using the transformations described above. As noted above in the section describing the transformation procedure, stiffness and the eigenvalues are dependent on the spacing of the points. Points separated by 90 degrees arc length on the sphere surface (orthogonal points) provide direct measurements of rotations about orthogonal axes. As the spacing decreases, the stiffness of the transformation matrix, as measured by the ratio of its maximum to minimum eigenvalues, increases. Therefore in measuring rotatations, the pair of measurement points should be chosen with the maximum possible spacing.

The advantage of the fixed, spaced relationship of the cross-hairs for a repeated pattern is that a fixed, predetermined accuracy can be calculated for the transformation to three-dimensional rotations.

Errors in Measurement

Dirt is a significant factor in the long-term reliability of trackballs and mice. The regular pattern and the extra degree of freedom provide a method of verification of the measurements. Two directions of measurement taken at each of a pair of points gives four measurements. Three can be used for the transformation into 3 rotations of the ball; the fourth can be used as a verification of the validity of the measurements. (The fourth, redundant measured quantity exists because it is not possible for the two points, fixed on the ball surface, to move such that they have a component of movement directly toward each other). If this happens, measurements from two other points are taken. Also the known regular pattern, gives a distance verification. These provide fail-safe robustness for a long term reliability of the mouse/trackball. In this manner, an irregularity in the pattern due to the existence of dirt or dust would be recognized, and a different point or set of points would be alternately be used to get a valid measurement.

Extensions

The projection of simplex shapes onto the surface may be replaced by a tiling process. In the tiling process, a uniform pattern of tiles (not necessarily polygonal) repeats itself over the sphere's surface. A given tile is interchangeable with another tile. Example of such patterns appear in the works of M. C. Escher. These may give detail finer than the basic polygons at the expense of a more complex pattern recognition algorithm.

The measured quantity of the ball has been discussed in terms of translations and rotations. For both translations and rotations, the measurements yield both the velocity and the relative location of points on the ball. The measurement system takes sequential "snapshots" of locations of points on the ball surface. The velocity is calculated by differentiating the locations with respect to the time interval between "snapshots". Thus, the measurement of relative location and velocity is equivalent.

However, this does not necessarily allow for the measurement of absolute location. Platonic solids have equivalent polygons which are tiled on the sphere surface. This means that two different polygons can appear to be indistinguishable. This can prevent the measurement of absolute locations of the ball. If absolute location is needed, the polygons need to be changed to enable a particular polygon to be distinguishable from other polygons.

I claim:

1. A device for measuring motion corresponding to coordinate information for input to a computer, comprising:
   a) a foundation,
   b) a spherical ball, said ball;
      i) having a center,
      ii) being rotatable with respect to said foundation about any axis passing through said center of said ball,
      iii) being coextensive with a sphere which is substantially fixed with respect to said foundation, such that said ball is retained adjacent to said foundation,
      iv) having first and second areas on the surface of said substantially fixed sphere, said first and second areas exposed for manipulation and suitable for grasping between a user's thumb and a user's finger when said thumb and said finger are located on opposite sides of said ball,
   c) a sensor, said sensor being:
      i) supported by said foundation,
      ii) capable of detecting rotation with respect to said foundation about at least one of said axes passing through said center of said ball,
   d) a retainer, said retainer:
      i) supported by said foundation,
      ii) covering a third area on the surface of said substantially fixed sphere, said third area separating said first area from said second area, iii) trapping said ball adjacent to said foundation such that said coextensive sphere is held substantially fixed with respect to said foundation, iv) exposing said first and second areas for grasping between said user's thumb and said user's finger;

whereby a user of said device for measuring motion corresponding to coordinate information can grasp exposed areas on opposite sides of said ball and apply opposing forces between said user's finger and said user's thumb, and thereby easily apply simultaneous rolling and twisting motions to said ball.

2. The device of claim 1 wherein said ball carries a pattern having contrasting reflective properties.

3. The device of claim 1 wherein said sensor is capable of detecting electromagnetic radiation emanating from the surface of said ball.

4. The device of claim 1 wherein all sensors are located below a horizontal equator of said ball.

5. The device of claim 1 wherein each of said first and second areas is of lesser magnitude than that of one hemisphere of said ball.

6. The device of claim 1 wherein the sum of said first and second areas is of greater magnitude than that of one hemisphere of said ball.

7. The device of claim 1 wherein two components of rotation of said ball are measured at two points on the surface of said sphere, said two points being separated by less than a 90 degree angle on the surface and said two rotation components being nonorthogonal, and said two nonorthogonal components being transformed to orthogonal x-y components.

8. The device of claim 7 wherein all rotation sensors are located below a horizontal equator of said sphere.

9. The device of claim 1 wherein wherein said device is attached adjacent to the front edge of a keyboard.

10. The device of claim 1 wherein said device is capable of measuring three components of rotation of said ball corresponding to x-y-z coordinate information.

11. The device of claim 1 wherein:

i) said ball carries a pattern having contrasting reflective properties, ii) said sensor is capable of detecting electromagnetic radiation emanating from the surface of said ball, iii) all sensors are located below a horizontal equator of said ball, iv) each of said first and second areas is of lesser magnitude than that of one hemisphere of said ball, and v) the sum of the magnitudes of said first and second areas is of greater magnitude than that of one hemisphere.

12. The device of claim 1, wherein:

a) said spherical ball carries a pattern of shapes on the surface of said ball, said pattern being formed by contrasting reflective properties on said surface of said ball, said pattern containing a plurality of curved line segments whose endpoints intersect at a plurality of vertices, said shapes being repeated at a plurality of locations on said surface of said ball, wherein a plurality of the intersections of said line segments are nonorthogonal, and b) said sensor is capable of detecting electromagnetic radiation emanating from a portion of the surface of said ball, and capable of detecting said contrasting reflective properties and said pattern on said ball, whereby said sensor can detect a given geometrical shape from a set of repeating geometrical shapes and can detect said intersecting curved line segments and locate at least one of said vertices.

13. The device of claim 12, wherein said pattern on said surface of said ball is based on a Platonic solid whose faces are projected to said surface of said ball.

14. The device of claim 12, wherein said pattern on said surface of said ball is based on a set of triangles whose edges are projected to said surface of said ball.

15. The device of claim 12, wherein said pattern on said surface of said ball is based on a set of intersecting line segments which are projected to said surface of said ball.

16. The device of claim 12, wherein said pattern on said surface of said ball forms a tiling, wherein a single geometrical shape is repeated at a plurality of locations on the sphere surface.

17. The device of claim 12 wherein said radiation emanating from said ball is reflected light.

* * * * *